Feb. 20, 1962  J. CHOCHOLA  3,022,113
METHOD OF CONVEYING FOAMED SLAG AND SIMILAR
MATERIAL IN A SEMI-PLASTIC STATE
Filed Sept. 9, 1959 2 Sheets-Sheet 1
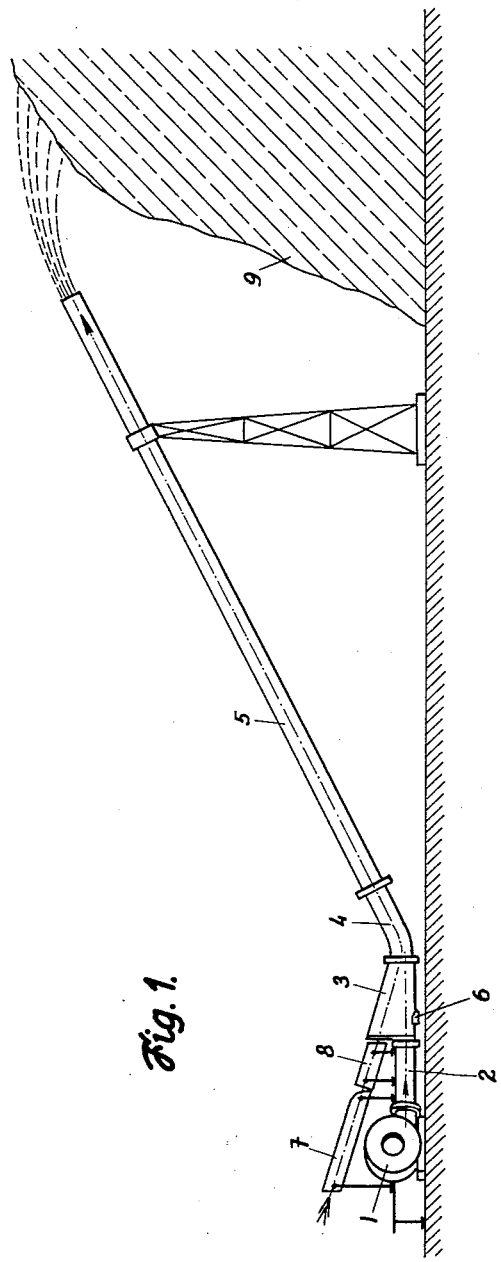
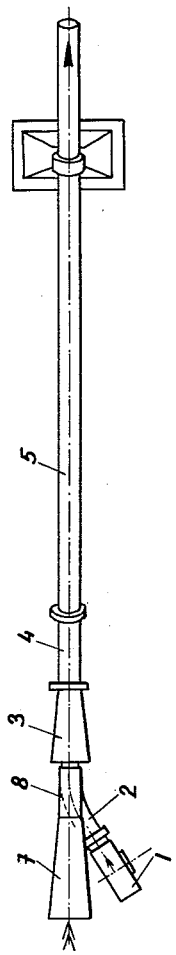
INVENTOR.
Jaromír Chochola
BY
Richard Lloyd
agt Feb. 20, 1962 J. CHOCHOLA 3,022,113
METHOD OF CONVEYING FOAMED SLAG AND SIMILAR
MATERIAL IN A SEMI-PLASTIC STATE
Filed Sept. 9, 1959 2 Sheets-Sheet 2
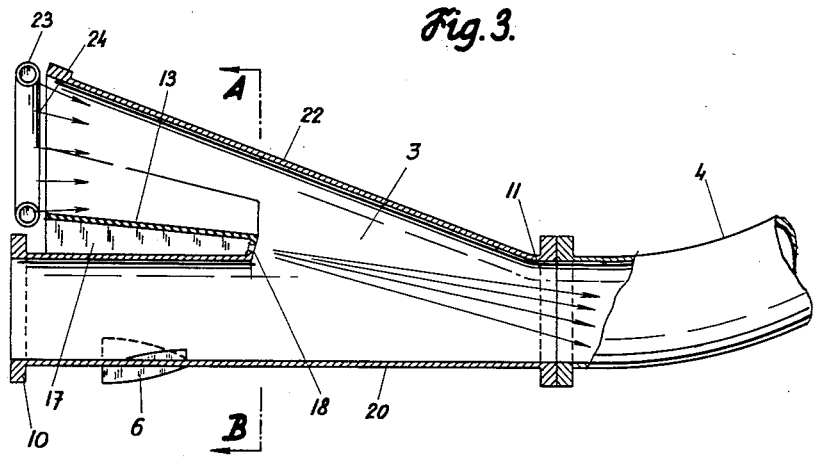
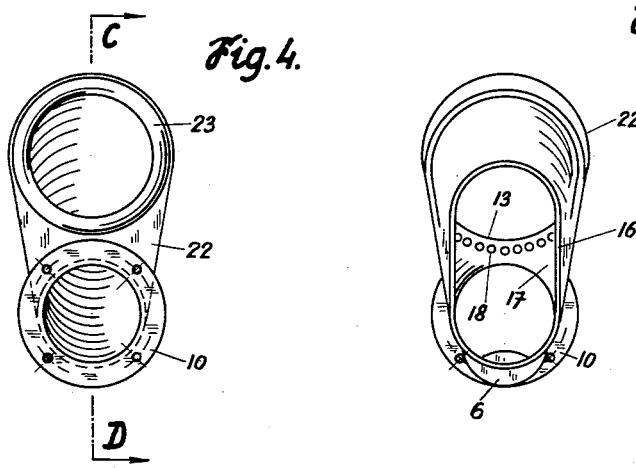
INVENTOR.
Jaromír Chochola
BY

United States Patent Office 3,022,113
Patented Feb. 20, 1962

3,022,113
METHOD OF CONVEYING FOAMED SLAG AND SIMILAR MATERIAL IN A SEMI-PLASTIC STATE
Jaromir Chochola, 150 Hlavni, Doksy, near Kladno, Czechoslovakia
Filed Sept. 9, 1959, Ser. No. 838,970
Claims priority, application Czechoslovakia Sept. 11, 1958
6 Claims. (Cl. 302—20)

Foamed blast furnace slag and other materials like keramsit, agloporit, kavitit and the like are becoming well accepted building materials due to their low price and favourable heat insulating properties. During the manufacture of foamed slag, the slag has to be conveyed in a semi-plastic state from the foaming device to the ripening place, where the crystallisation process takes place and where it has to be gradually cooled down to about 800° C. Only thereafter it is possible to apply water for cooling the slag without the danger of effecting a granulation of the slag.

In presently used arrangements the slag is usually conveyed from the foaming device to a ripening dump by a scraper or plate band conveyor. The unfavourable conditions under which these conveyors have to work result in a large number of failures and in high initial and maintenance costs. In addition partial sintering of the foamed slag occurs rather frequently.

It is an object of this invention to efficiently convey the foamed slag from the foaming device to the ripening site without using any conveyors having the above drawbacks. In accordance with this invention the foamed slag is conveyed in a semi-plastic state by a stream of air through a conveying tube while the walls of the latter are simultaneously cooled with a cooling liquid. Further, the kinetic energy which the foamed slag gains in the course of the foaming process may be used for supplying the foamed slag to the space from which it is carried along by a stream of a gaseous medium into the conveying tube.

An embodiment of this invention is shown in the accompanying drawings, where FIG. 1 is a side elevation view and FIG. 2 is a top view of the overall arrangement of the conveying means, FIG. 3 is a longitudinal section of the collecting chamber of the conveying means, the section being taken in the plane of the line C—D of FIG. 4, FIG. 4 is an end view of this chamber at the inlet to said chamber, and FIG. 5 is a sectional view taken along the line A—B in FIG. 3.

Referring to FIGS. 1 and 2, it will be seen that an arrangement embodying this invention includes a supply trough 7, by means of which the slag is supplied to the conveying means, and from which the slag overflows into the foam producing chamber 8, where water under pressure, air or some other gas is driven by nozzles into the slag, which thus becomes foamed. By suitably selecting the direction of the openings of the nozzles, the foamed slag is driven with a certain kinetic energy into a collecting chamber 3 which is also connected to the output of a rotary blower 1. The blower 1 drives air or some other gas into the chamber 3 and carries along particles of the foamed slag into the conveying tubes 4 and 5, by means of which the slag is conveyed to a dump 9 where it ripens. The collecting chamber 3 (FIGS. 3, 4 and 5) is provided with a slag receiving trough 13, into which the foamed slag overflows from the foam producing chamber 8, and furthermore with a tube 20 which is connected by a flange and a tube 2 with the output of the rotary blower 1. The trough 13 and the tube 20 open into the inner space of chamber 3, which is connected by means of the flange 11 to the bent tube 4 of the conveying tube 5. The trough 13 is connected by side walls 16 with the tube 20 so as to define, between the trough 13 and the tube 20, a closed space 17 which narrows towards its front end and is then provided with a number of nozzles 18 arranged along an arc below the outlet of the trough 13. The space 17 is connected to a source (not shown) of liquid under pressure. In the lower part of the tube 20 there are openings 6 in the shape of a Venetian blind, which allow the escape of surplus water from the collecting chamber 3. The tube 20 and the trough 13 are surrounded by a mantle or cover 22 protecting the surrounding space from particles of slag and directing the stream of foamed slag. A tube in the shape of an annular ring or manifold 23 is placed in front of the entrance end of the trough 13 and along the circumference of the mantle 22 and is connected to a source of liquid under pressure which is discharged through openings 24 in the direction toward trough 13 and mantle 22.

The slag which is poured from a ladle into the trough 7 overflows therefrom into the foam producing chamber 8, where it is foamed by the action of air and water nozzles and where it simultaneously receives a substantial kinetic energy by which it is driven to the slag receiving trough 13 and into the space of the collecting chamber 3. The walls of this chamber and the bottom of the trough 13 are moistened with water from the openings 24 of annular tube 23 to prevent any possible sticking of the slag. The foamed slag with steam and air carried along enters the collecting chamber 3 with a certain speed, the steam resulting from the water from tube 23. Air under pressure from the blower 1 is driven through tube 20 into collecting chamber 3 and carries along the mixture of foamed slag and steam into the bent tube 4 and the conveying tube 5. Additional liquid, which prevents sticking of the slag to the walls of the bent tube 4 and the tube 5, is driven into the chamber 3 through nozzles 18 below the trough 13. The surplus water may be carried away by the drain openings 6 in the shape of a Venetian blind. These openings are particularly important when starting the process, at which time the pressure liquid is supplied from tube 23 to the chamber prior to the foamed slag, and surplus water remaining in tube 20 would be an obstacle to the starting of slag conveying.

With the above described arrangement the expensive plate or scraper conveyors are eliminated and the process of the foaming of the slag is prolonged. As the foamed slag does not strike any solid walls, partial sintering of the slag does not occur, so that the conveyed slag retains its original porous state. The conveying tube can be easily manipulated so that the slope or lateral deviation may be adjusted to provide the most favourable conditions when heaping the slag on the dump site for ripening.

It is to be understood that the constructional details of the described conveyor arrangement may be arranged in a different way without deviating from the scope of this invention. Thus, for example, it is possible to replace the number of nozzles 18 below the lower circumference of the outlet of the trough 13 by a single arc shaped slot, or the blower 1 may be placed below the foam producing device 8 although the latter arrangement will be obviously less advantageous due to the danger of spilling particles of slag on the blower. The angle between the trough 13 and the tube 20 supplying air from the blower may be varied according to the properties of the conveyed slag and to the speed which it attains during foaming to obtain the most favourable conditions for conveying slag through the tube 5.

Although the illustrated arrangement has been described with reference to the conveying of slag, similar arrangements may be employed for the pneumatic conveying of other similar materials in semi-plastic state, for example, foamed slate agloporit, kavitit, keramsit and the like.

I claim:

1. An apparatus for conveying foamed semi-plastic slag, comprising a conveying tube, means at one end of said tube defining a chamber having an inlet for the foamed semi-plastic slag to be conveyed, means directing jets of cooling liquid into said chamber adjacent said inlet for the foamed slag for effecting surface chilling of the foamed slag and for wetting and cooling the interior surface of said chamber, blower means having an outlet for air under pressure, and duct means directing said air under pressure from said outlet into said chamber in the direction toward said one end of the tube to further cool the foamed slag and to carry along the latter through said tube for discharge at the other end of the latter, said inlet of the chamber being defined by a trough disposed above said duct means and defining a space therebetween, the apparatus further comprising means closing the sides of said space so that the latter is adapted to contain a cooling liquid for cooling said trough receiving the foamed semi-plastic slag.

2. An apparatus for conveying foamed semi-plastic slag as in claim 1; wherein said means directing jets of cooling liquid into said chamber includes nozzles opening from said space into said chamber.

3. An apparatus for conveying foamed semi-plastic slag as in claim 2; wherein said means directing jets of cooling liquid into said chamber further includes a manifold provided adjacent the end of said trough remote from said chamber and adapted to receive cooling liquid, said manifold having orifices opening toward said trough.

4. An apparatus for conveying foamed semi-plastic slag as in claim 1; wherein said duct means has a lower part and drain openings in said lower part for discharging surplus cooling liquid from said chamber.

5. An apparatus for conveying foamed semi-plastic slag, comprising a conveying tube, means at one end of said tube defining a chamber, the chamber-defining means having an end remote from said one end of said tube, trough means to guide the foamed semi-plastic slag into said chamber, means provided on said remote end of the chamber-defining means and directing jets of cooling liquid toward the interior surfaces of said trough and chamber-defining means to effect wetting and cooling of said surfaces, means defining a space within said chamber to conduct cooling liquid, said space-defining means having a free end reaching into said chamber, nozzle means at said free end to direct jets of the cooling liquid toward the foamed slag after having left said trough, blowing means having an outlet for air under pressure, and duct means directing the air from the blowing means into said chamber to carry the foamed slag having left said trough into said conveying tube.

6. In the apparatus according to claim 5, said space-defining means being provided so as to define said space adjacent said trough and to make the cooling liquid passing through said space help cool the interior surfaces of said trough.

References Cited in the file of this patent

UNITED STATES PATENTS

| | | |
|---|---|---|
| 834,818 | Leland | Oct. 30, 1906 |
| 1,139,091 | Weber | May 11, 1915 |
| 1,654,406 | Bonner | Dec. 27, 1927 |
| 2,819,930 | Foreman | Jan. 14, 1958 |